United States Patent [19]
Suzuki et al.

[11] Patent Number: 5,420,698
[45] Date of Patent: May 30, 1995

[54] INFORMATION TRANSMISSION APPARATUS AND IMAGE READING APPARATUS WITH SELECTIVE MOVEMENT AND TILTING OF IR REJECTING DEVICE

[75] Inventors: Kazuhiro Suzuki, Hadano; Tadashi Fukui, Atsugi, both of Japan

[73] Assignee: Stanley Electric Co., Ltd., Tokyo, Japan

[21] Appl. No.: 19,315

[22] Filed: Feb. 18, 1993

[30] Foreign Application Priority Data

Feb. 25, 1992 [JP] Japan .................. 4-017380 U

[51] Int. Cl.⁶ .................. H04N 1/04; G01N 21/25; G02B 5/22; G02B 13/14
[52] U.S. Cl. .................. 358/474; 359/361; 359/359; 359/889; 359/356; 356/418
[58] Field of Search .................. 358/113, 139; 359/66, 359/68, 70, 210, 350, 355, 356, 359, 885, 358, 889, 589, 360, 361; 356/419, 418

[56] References Cited

U.S. PATENT DOCUMENTS

| | | | |
|---|---|---|---|
| 4,807,026 | 2/1989 | Nishioka | 358/98 |
| 5,016,096 | 5/1991 | Matsunawa | 358/75 |
| 5,063,461 | 11/1991 | Copenhaver | 358/474 |
| 5,070,407 | 12/1991 | Wheeler | 358/225 |
| 5,075,768 | 12/1991 | Wirtz | 358/75 |

Primary Examiner—Edward L. Coles, Sr.
Assistant Examiner—Allan A. Esposo
Attorney, Agent, or Firm—Varndell Legal Group

[57] ABSTRACT

An infrared-rejecting device is positioned in a light path and tilted thereto to reflect infrared radiation and to prevent infrared radiation from being applied to a photodetector or a line sensor for preventing the photodetector or the line sensor from operating in error or from suffering a reduction in its resolution. The infrared-rejecting device may be positioned out of the light path to allow light applied to the photodetector or the line sensor to remain unattenuated, i.e., to prevent the light applied to the photodetector or the line sensor from being reduced in intensity.

4 Claims, 4 Drawing Sheets

INFORMATION TRANSMISSION APPARATUS AND IMAGE READING APPARATUS WITH SELECTIVE MOVEMENT AND TILTING OF IR REJECTING DEVICE

BACKGROUND OF THE INVENTION

1. Field of the Invention

The present invention relates to an information transmission apparatus and an image reading apparatus, suitable for use in a facsimile machine, a copying machine, or the like, for transmitting information and reading information from an original without disturbance while preventing infrared radiation from being applied to a photodetector or a line sensor.

2. Description of the Prior Art

FIG. 1 of the accompanying drawings shows a conventional image reading apparatus for use in a facsimile machine, a copying machine, or the like. As shown in FIG. 1, the conventional image reading apparatus has a feed mechanism 3 for moving an original 2 along an Y-axis indicated by the arrow Y, and light sources 4a, 4b such as fluorescent lamps, for example, energizable with high-frequency electric energy for applying light to the original 2 to scan and read information from an information-bearing surface of the original 2 along an X-axis perpendicular to the Y-axis. The image reading apparatus also includes a graded-index rod-lens array 6 to which light reflected by the information-bearing surface of the original 2 is applied, and a line sensor 8 comprising a linear array of CCDs for receiving the reflected light through the rod-lens array 6 and producing a readout signal representing the information of the original 2.

The conventional image reading apparatus shown in FIG. 1 operates as follows:

The original 2 is moved along the Y-axis by the feed mechanism 3. At the same time, the information-bearing surface of the original 2 is scanned along the X-axis by the light emitted from the light sources 4a, 4b. Light reflected by the information-bearing surface of the original 2 is applied through the rod-lens array 6 to the line sensor 8, which generates a readout signal representing the information of the original 2.

As the original 2 moves along the Y-axis, the line sensor 8 produces a readout signal per scanning line along X-axis in response to a readout drive signal from a driver circuit (not shown). In this manner, the original 2 is scanned along the Y- and X-axes so that the entire information-bearing surface thereof is two-dimensionally scanned and read.

The line sensor 8 of the conventional image reading apparatus is disadvantageous in that its sensitivity along the CCD array has a low uniformity level and its resolution is low.

FIG. 2 of the accompanying drawings illustrates spectral sensitivity characteristics of the line sensor 8, showing its relative sensitivity plotted against the wavelength of light applied thereto.

As shown in FIG. 2, the relative sensitivity of the line sensor 8 has a peak value in an infrared range where the applied light has a wavelength of 650 nm. Since the relative sensitivity of the line sensor 8 to the infrared range is higher than to a visible range of radiations, if some infrared radiation of light from the light sources 4a, 4b which comprise tungsten lamps or halogen lamps or extraneous light is added to the light that falls on the light sensor 8, then the line sensor 8 tends to operate in error. That is, the resolution of the line sensor 8 is liable to decrease, preventing the line sensor 8 to read the desired information with accuracy.

SUMMARY OF THE INVENTION

It is a first object of the present invention to provide an information transmission apparatus which is capable of transmitting information accurately while preventing infrared radiation from being applied to a photodetector to avoid erroneous operation of the photodetector.

A second object of the present invention is to provide an information transmission apparatus having an infrared-rejecting device whose angle is variable to effectively block the application of infrared radiation to a photodetector.

A third object of the present invention is to provide an information transmission apparatus having an infrared-rejecting device which can be brought selectively into and out of a light path for allowing light applied to a photodetector to remain unattenuated and hence preventing the intensity of the light from being lowered when there is no danger of the addition of infrared radiation to light applied to the photodetector.

A fourth object of the present invention is to provide an image reading apparatus which is capable of preventing infrared radiation from being applied to a line sensor to prevent the line sensor from operating in error and hence to avoid a reduction in the resolution of the line sensor for accurate reading of an image.

A fifth object of the present invention is to provide an image reading apparatus having an infrared-rejecting device whose angle is variable to effectively block the application of infrared radiation to a line sensor.

A sixth object of the present invention is to provide an image reading apparatus having an infrared-rejecting device which can be brought selectively into and out of a light path for allowing light, which bears information of an original, applied to a line sensor to remain unattenuated and hence preventing the intensity of the light from being lowered when there is no danger of the addition of infrared radiation to light applied to the line sensor.

According to the present invention, there is provided an information transmission apparatus comprising light-emitting means for emitting light in response to an input information signal, an objective disposed in a path of the light emitted by the light-emitting means, a photodetector for producing an output information signal representative of the input information signal from the light that has passed through the objective, and an infrared-rejecting device disposed between the light-emitting means and the objective and tilted with respect to the path of the light, for preventing infrared radiation from being applied to the photodetector.

The information transmission apparatus may further comprise an angle varying mechanism for varying an angle through which the infrared-rejecting device is tilted.

The information transmission apparatus may further comprise a mechanism for moving the infrared-rejecting device selectively into and out of the path of the light.

According to the present invention, there is also provided an image reading apparatus comprising an optical system for reading an original, and a mechanism for moving the original with respect to the optical system, the optical system comprising irradiating means for applying light to the original, a rod-lens array for collecting light reflected by the original, a line sensor for producing a readout information signal representative of information of the original from the light collected by the rod-lens array, and an infrared-rejecting device disposed in a path of the light reflected by the original through the rod-lens array to the line sensor and tilted with respect to the path of the light, for preventing infrared radiation from being applied to the line sensor.

The image reading apparatus may further comprise an angle varying mechanism for varying an angle through which the infrared-rejecting device is tilted.

The image reading apparatus may further comprise a mechanism for moving the infrared-rejecting device selectively into and out of the path of the light.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 3:
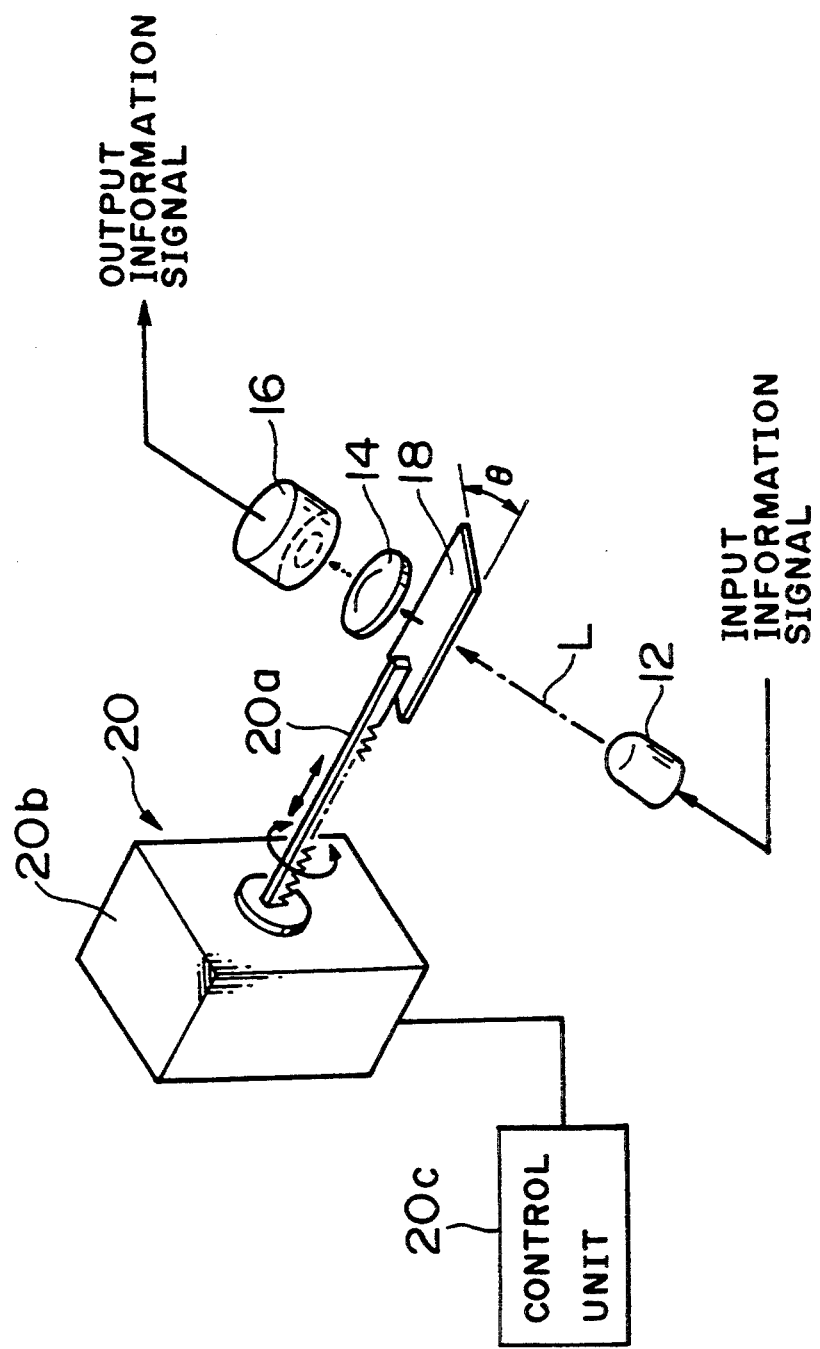
FIG. 3 is a schematic perspective view of an information transmission apparatus according to a first embodiment of the present invention.

FIG. 3 schematically shows an information transmission apparatus according to a first embodiment of the present invention. As shown in FIG. 3, the information transmission apparatus has a light-emitting device 12 such as a light-emitting diode for emitting light L in response to an input information signal such as a pulsed signal supplied from an information processing apparatus (not shown), an objective 14, and a photodetector 16 such as a CCD for generating an output information signal by photoelectrically converting the light emitted from the light-emitting device 12 and transmitted through the objective 14.

The information transmission apparatus also has an infrared-rejecting device 18 disposed between the light-emitting device 12 and the objective 14, and a drive mechanism 20 for moving the infrared-rejecting device 18 selectively into and out of the path of the light L and also angularly moving the infrared-rejecting device 18 through an angle $\theta$ relative to a plane normal to the path of the light L.

The drive mechanism 20 comprises a rotatable, axially movable rod 20a having one end fixed to an end of the infrared-rejecting device 18, an actuator 20b comprising a motor and gears and operatively coupled to the rod 20a through a rack-and-pinion mechanism for rotating the rod 20a about its own axis and axially moving the rod 20a, and a control unit 20c for controlling the actuator 20b.

The information transmission apparatus operates as follows:

An input information signal supplied from the information processing system is applied to the light-emitting device 12, which emits light L toward the photodetector 16 through the objective 14. The actuator 20b is controlled by the control unit 20c to move the infrared-rejecting device 18 into the path of the light L, and also to turn the infrared-rejecting device 18 through the angle $\theta$. If extraneous infrared radiation or infrared radiation from the light-emitting device 12 is added to the light L, then the added infrared radiation is reflected and absorbed by the infrared-rejecting device 18 so that it will not be applied to the photodetector 16. Since the infrared-rejecting device 18 is tilted with respect to the path of the light L, the infrared radiation is reflected out of the path of the light L by the tilted infrared-rejecting device 18 and hence prevented from being applied back to the light-emitting device 12.

Figure 1:
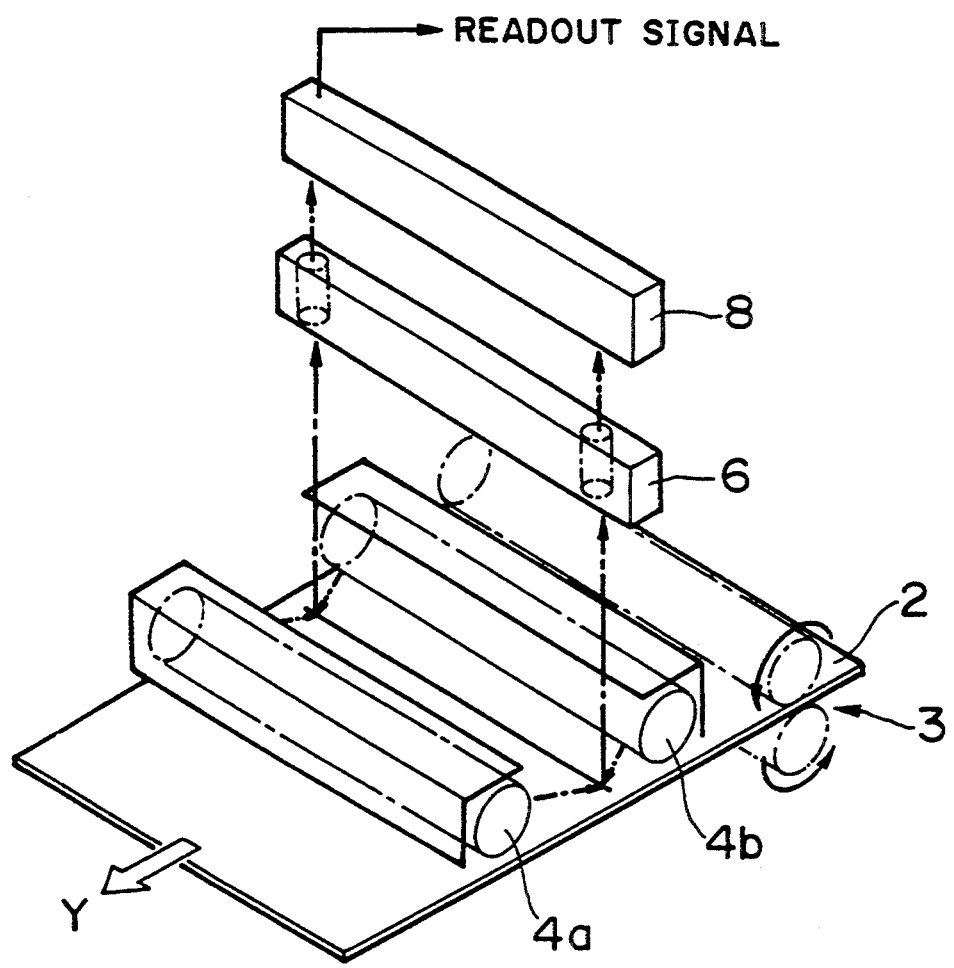
FIG. 1 is a schematic perspective view of a conventional image reading apparatus.
Figure 2:
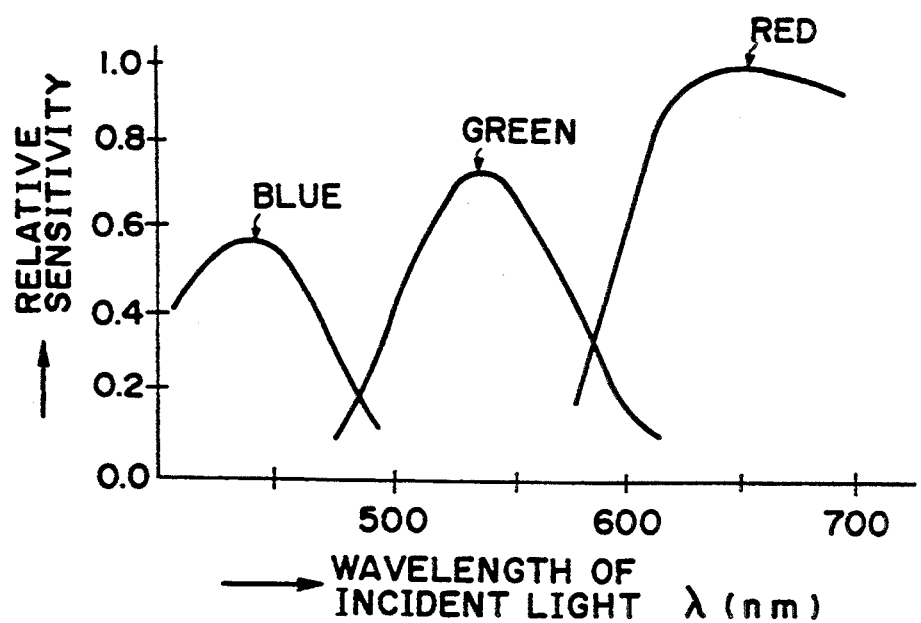
FIG. 2 is a graph showing wavelength vs. relative sensitivity characteristics of a photodetector or a line sensor.

When the angle $\theta$ of the infrared-rejecting device 18 is slightly varied, the reflecting efficiency of the infrared-rejecting device 18 is increased with respect to the frequencies in the infrared range shown in FIG. 2 and the angle at which the light is applied to the infrared-rejecting device 18.

If no infrared radiation is added to the light L from the light-emitting device 12 or the information transmission apparatus is placed in a dark chamber with an openable cover, then the infrared-rejecting device 18 is placed out of the path of the light L. Specifically, the control unit 20c controls the actuator 20b to axially move the rod 20a toward the actuator 20b until the infrared-rejecting device 18 is not positioned between the light-emitting device 12 and the objective 14. Therefore, the reduction in the intensity of the light L, which would otherwise be caused by the infrared-rejecting device 18 positioned in the path of the light L, does not occur, and hence the light L applied from the light-emitting device 12 to the photodetector 16 remains unattenuated. Consequently, the photodetector 16 can produce an output information signal such as a pulsed signal which accurately represents the input information signal without pulse dropouts, for example.

In FIG. 3, the information of an original such as a bar code which may be produced by applying light thereto from the light-emitting device 12 may be read by the photodetector 16.

Figure 4:
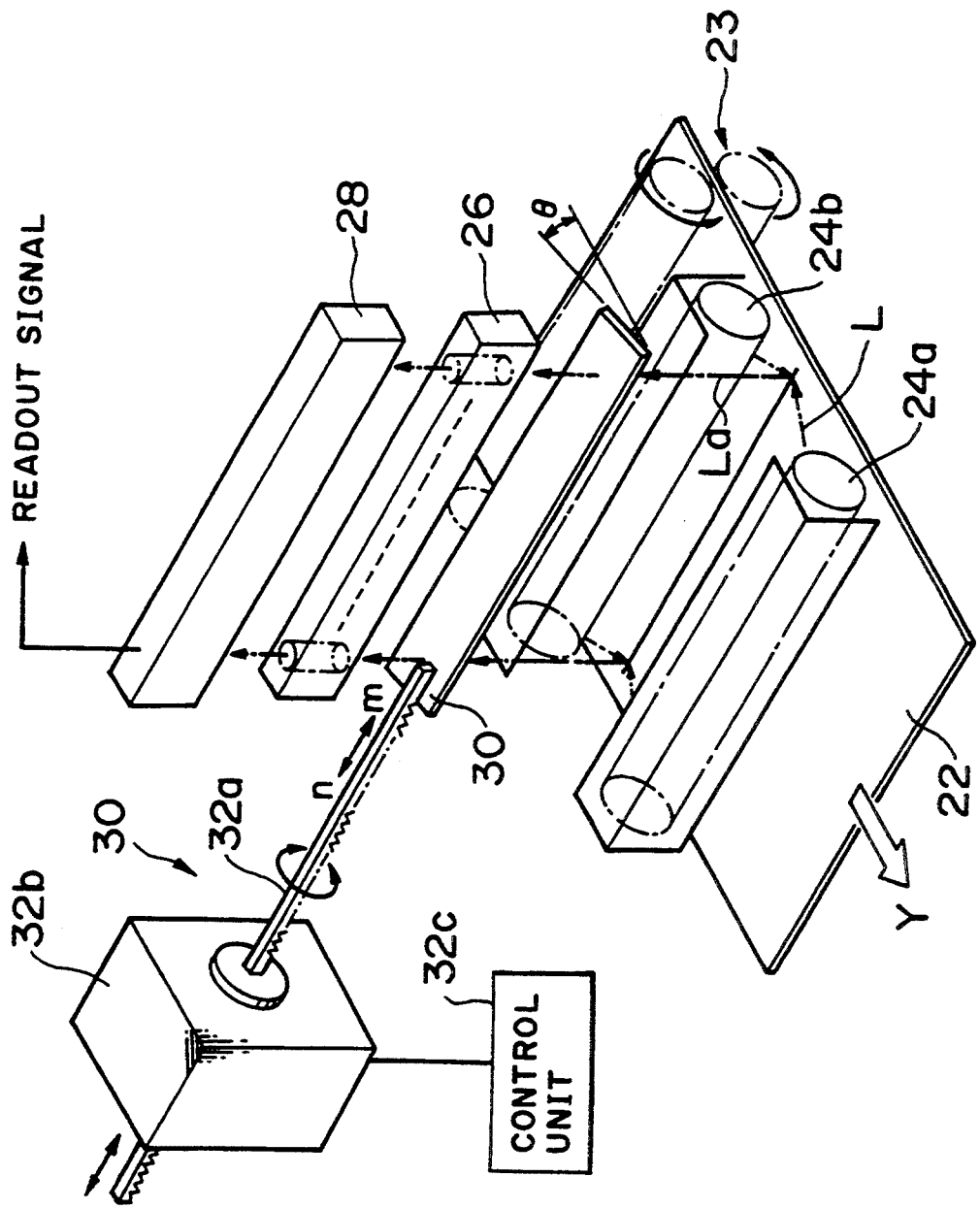
FIG. 4 is a schematic perspective view of an image reading apparatus according to a second embodiment of the present invention.

FIG. 4 shows an image reading apparatus according to a second embodiment of the present invention. As shown in FIG. 4, the image reading apparatus has a feed mechanism 23 for moving an original 22 along an Y-axis indicated by the arrow Y, and light sources 24a, 24b such as fluorescent lamps, for example, energizable with high-frequency electric energy for applying light L to the original 22 to scan and read information from an information-bearing surface of the original 22 along an X-axis perpendicular to the Y-axis. The image reading apparatus also includes a graded-index rod-lens array 26 to which light La reflected by the information-bearing surface of the original 2 is applied, and a line sensor 28 comprising a linear array of CCDs for receiving the reflected light La through the rod-lens array 26 and producing a readout signal representing the information of the original 22.

The image reading apparatus further includes an infrared-rejecting device 30 disposed between the original 22 and the rod-lens array 26, and a drive mechanism 32 for moving the infrared-rejecting device 30 into and out of the path of the light La and also angularly moving the infrared-rejecting device 30 through an angle θ relative to a plane normal to the path of the light La.

The drive mechanism 32 comprises a rotatable, axially movable rod 32a having one end fixed to an end of the infrared-rejecting device 30, an actuator 32b comprising a motor and gears and operatively coupled to the rod 32a through a rack-and-pinion mechanism for rotating the rod 32a about its own axis and axially moving the rod 32a, and a control unit 32c for controlling the actuator 32b.

The image reading apparatus shown in FIG. 4 operates as follows:

The line sensor 28 has the same spectral sensitivity characteristics as those shown in FIG. 2. The original 22 is moved along the Y-axis by the feed mechanism 22. At the same time, the information-bearing surface of the original 22 is scanned along the X-axis by the light L emitted from the light sources 24a, 24b. Light La reflected by the information-bearing surface of the original 22 is applied through the rod-lens array 26 and the infrared-rejecting device 30 to the line sensor 28, which generates a readout signal representing the information of the original 22. As the original 22 moves along the Y-axis, the line sensor 28 produces a readout signal per scanning line along X-axis in response to a readout drive signal from a driver circuit (not shown). In this manner, the original 22 is scanned along the Y- and X-axes so that the entire information-bearing surface thereof is two-dimensionally scanned and read.

The actuator 32b is controlled by the control unit 32c to move the infrared-rejecting device filter 30 in the direction indicated by the arrow m into the path of the light La, and also to turn the infrared-rejecting device 30 through the angle θ. If extraneous infrared radiation or infrared radiation from the light sources 24a, 24b which comprise tungsten lamps or halogen lamps is added to the light La, then the added infrared radiation is reflected and absorbed by the infrared-rejecting device 30 so that it will not be applied to the line sensor 28. Since the infrared-rejecting device 30 is tilted with respect to the path of the light La, the infrared radiation is reflected out of the path of the light La by the tilted infrared-rejecting device 30 and hence prevented from being applied back to the light sources 24a, 24b.

When the angle θ of the infrared-rejecting filter 30 is slightly varied, the reflecting efficiency of the infrared-rejecting device 30 is increased with respect to the frequencies in the infrared range shown in FIG. 2 and the angle at which the light is applied to the infrared-rejecting device 30.

If no infrared radiation is added to the light La from the subject 22 or the image reading apparatus is placed in a dark chamber with an openable cover, then the infrared-rejecting device 30 is placed out of the path of the light La. Specifically, the control unit 32c controls the actuator 32b to axially move the rod 32a toward the actuator 32b in the direction indicated by the arrow n until the infrared-rejecting device 30 is not positioned between the original 22 and the rod-lens array 26. Therefore, the reduction in the intensity of the light La, which would otherwise be caused by the infrared-rejecting device 30 positioned in the path of the light La, does not occur, and hence the light La applied to the line sensor 28 remains unattenuated. Consequently, the line sensor 28 can produce an output information signal which accurately represents the input information signal.

Although certain preferred embodiments of the present invention have been shown and described in detail, it should be understood that various changes and modifications may be made therein without departing from the scope of the appended claims.

What is claimed is:

1. An information transmission apparatus comprising:
   light-emitting means for emitting light in response to an input information signal;
   an objective disposed in a path of light emitted by said light-emitting means;
   a photodetector means for producing an output information signal representative of said input information signal from light that passed through said objective;
   an infrared-rejecting means, disposed between said light-emitting means and said objective and tilted with respect to said path of light, for reflecting infrared radiation and preventing infrared radiation from being applied to said photodetector means;
   an angle varying means for varying an angle through which said infrared-rejecting means is tilted; and
   a means for moving said infrared-rejecting means selectively into and out of said path of light.

2. An information transmission apparatus according to claim 1, wherein said angle varying means and said means for moving said infrared-rejecting means selectively into and out of said path of light are combined in a single unit, said single unit including an axially movable rod having a first end fixed to an end of said infrared-rejecting means and a second end received in an actuated means for rotating said axially movable rod about its axis and for axially moving said rod.

3. An image reading apparatus comprising:
   an optical system for reading an original; and
   a mechanism for moving the original with respect to said optical system;
   said optical system comprising:
   irradiating means for applying light to the original;
   a rod-lens array means for collecting light reflected by the original;
   a line sensor means for producing a readout information signal representative of information of the original from light collected by said rod-lens array;
   an infrared-rejecting means, disposed in a path of light reflected by the original through said rod-lens array means to said line sensor means and tilted with respect to said path of light, for reflecting infrared radiation and preventing infrared radiation from being applied to said line sensor means;
   an angle varying means for varying an angle through which said infrared-rejecting means is tilted; and
   a means for moving said infrared-rejecting means selectively into and out of said path of light.

4. An image reading apparatus according to claim 3, wherein said angle varying means and said means for moving said infrared-rejecting means selectively into and out of said path of light are combined in a single unit, said single unit including an axially movable rod having a first end fixed to an end of said infrared-rejecting means and a second end received in an actuator means for rotating said axially movable rod about its axis and for axially moving said rod.

* * * * *